(12) United States Patent
Nagato et al.

(10) Patent No.: US 6,616,791 B2
(45) Date of Patent: Sep. 9, 2003

(54) FLAP FUSION SHEET, METHOD OF MANUFACTURING THE SAME, AND APPLICATIONS THEREOF

(75) Inventors: Keiji Nagato, Okayama (JP); Kazumasa Nakashima, Okayama (JP)

(73) Assignee: Hagihara Industries Inc., Kurashiki (JP)

( * ) Notice: Subject to any disclaimer, the term of this patent is extended or adjusted under 35 U.S.C. 154(b) by 0 days.

(21) Appl. No.: 10/055,750

(22) Filed: Jan. 23, 2002

(65) Prior Publication Data

US 2002/0064630 A1 May 30, 2002

Related U.S. Application Data

(62) Division of application No. 09/404,622, filed on Sep. 23, 1999, now Pat. No. 6,387,491.

(30) Foreign Application Priority Data

Sep. 24, 1998 (JP) .............................................. 10-269190

(51) Int. Cl.⁷ ............................................... B32B 31/00
(52) U.S. Cl. .......................... 156/272.2; 156/71; 156/84; 156/157; 156/166; 156/182; 156/199; 156/304.5; 156/304.6; 156/324
(58) Field of Search ............................ 156/71, 73.1, 84, 156/157, 166, 181, 182, 196, 199, 202, 204, 216, 217, 227, 272.2, 273.7, 275.1, 285, 304.1, 304.4, 304.5, 304.6, 304.7, 324

(56) References Cited

U.S. PATENT DOCUMENTS 4,792,477 A 12/1988 Ochiumi

*Primary Examiner*—Merrick Dixon
(74) *Attorney, Agent, or Firm*—Dilworth & Barrese, LLP

(57) ABSTRACT

A flap fusion sheet is formed by folding a flap continuous in the longitudinal direction in two, overlaying the side ends and fusing the inner sides of the side ends by heat to form a sleeve, at one side of a continuous backing sheet formed by laminating layers made of low melting point polyolefin on both sides of a flat yarn cloth made of high melting point polyolefin, and fusing the outer side of the sleeve in the longitudinal direction at least at other positions than the end portions in the width direction of the backing sheet.

6 Claims, 15 Drawing Sheets

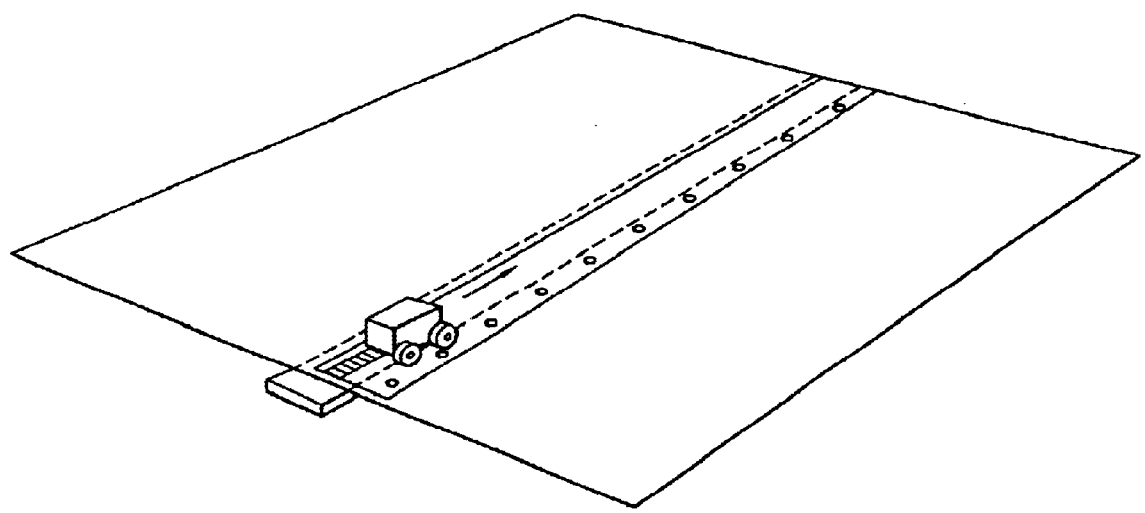
FIG 6
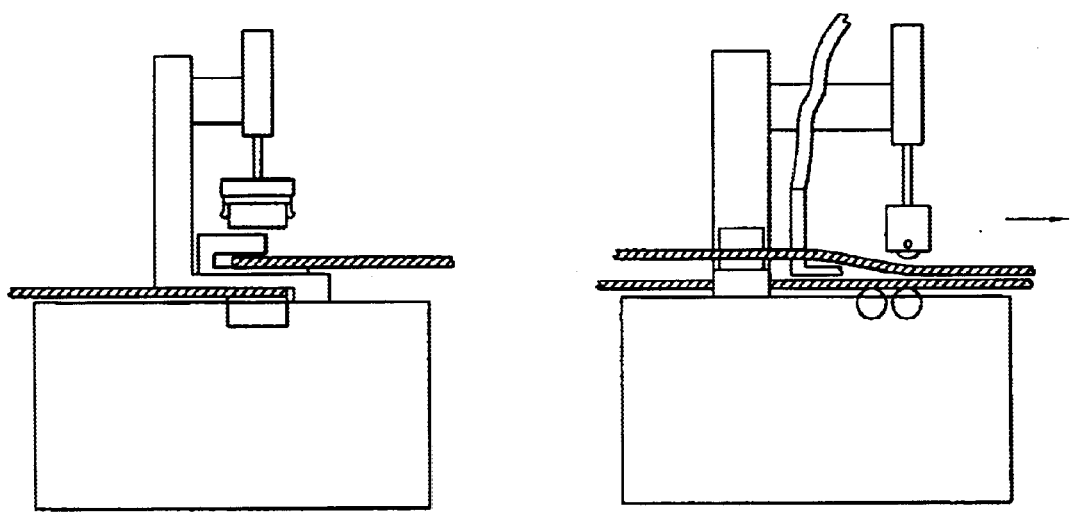
FIG 7A  FIG 7B

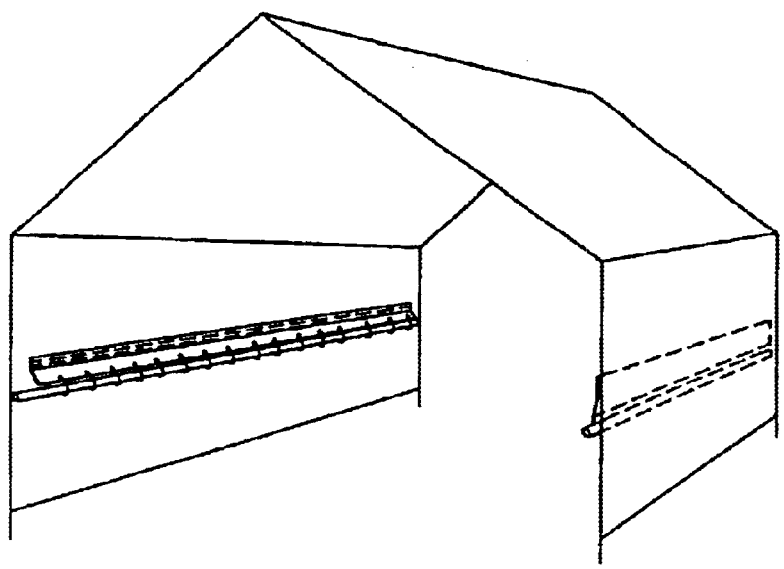
FIG 8
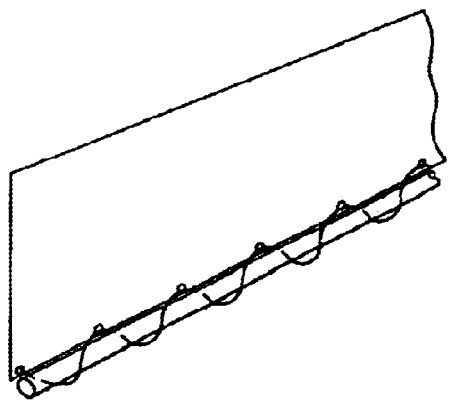 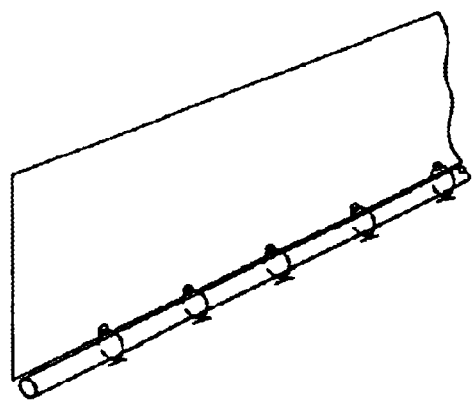
FIG 9A  FIG 9B

FLAP FUSION SHEET, METHOD OF MANUFACTURING THE SAME, AND APPLICATIONS THEREOF

CROSS REFERENCE TO RELATED APPLICATIONS

The present application is a divisional of U.S. application Ser. No. 09/404,622 filed Sep. 23, 1999, now U.S. Pat. No. 6,387,491 to which priority is claimed.

FIELD OF THE INVENTION

The present invention relates to a flap fusion sheet, a method of manufacturing the same, and applications of flap fusion sheet, and more particularly to a flap fusion sheet preferably used in garage, simplified warehouse, scaffold sheet, hay cover, cotton cover and the like, and a method of manufacturing the same, and its applications.

BACKGROUND OF THE INVENTION

Hitherto, sheets used in garage, simplified warehouse, scaffold sheet, hay cover and others are provided with coupling holes, for example, eyelets drilled in the sheet peripheral margins hemmed by folding over sheets, and fixed and used by passing ropes or the like through eyelets and tying to pipes or other skeletal members. As far as the sheet area is small, it can be firmly fixed to the skeletal member only by coupling through the coupling holes provided in the peripheral area of the sheet, but in the case of a wide sheet area, it may be peeled of f the skeletal member by wind pressure, or the weight is too heavy to support, and it is hard to fix safely and stably. Accordingly, band flaps drilling coupling holes such as eyelet are bonded to desired positions of the sheet, and the coupling of the coupling holes and the skeletal members is reinforced.

FIG. 1 shows a covering sheet used in a garage or the like, and the sheets are stretched not only on the roof of the skeletal member but also on the side to give shielding effect, so that the appearance is improved. In this case, the sheets are preferred to be coupled with the skeletal members not only on the ridges of the top of the roof but also on the contact points with the skeletal members at the side, and flaps having coupling holes provided at positions corresponding to the edge on the top of the roof of the back side of the sheet and the contact points with the skeletal members at the side are attached, and the sheets are firmly coupled to the skeletal members by linking the coupling holes and skeletal members by ropes or the like.

FIG. 2 shows skeletal members used in covering sheet for simplified warehouse, in which flaps are attached to the back side positions of the sheets contacting with the skeletal members in the longitudinal direction for forming the profile of the covering sheet for simplified warehouse, and this is preferably used in simplified warehouse or stable.

FIG. 3 is an example used as scaffold sheet, and usually the scaffold sheet is 1.8 m wide by 5.1 m long as shown in FIG. 3(*a*), and is used by coupling to the pipe rack or similar skeletal member by coupling ropes, but it takes time and labor for positioning and coupling each sheet, and gaps are formed between coupled sheets and the safety is lowered, but as shown in FIG. 3(*b*), for example, when a flap having coupling holes in the middle is attached to the sheet of 3.6 m wide by 5.1 m long in a size of joining two conventional sheets, the number of sheets to be coupled is decreased and the working efficiency is enhanced, and moreover gaps between sheets are decreased and the safety is enhanced, and this is particularly used preferably in the scaffold sheet.

FIG. 4 shows a hay cover, which is used to protect a stacked block of hay from water and prevent from scattering, but when pulled excessively in the horizontal direction in order to prevent from scattering, the stress is concentrated in the hemmed portion and it is likely to tear apart, but when a high strength sheet is used to prevent from tearing, the cost is higher. Accordingly, when a picket for tensile fixing tool is attached to one side of the sheet, the tensile stress is dispersed between the hemmed portion and the picket and breakage of the sheet may be prevented, and a low-cost sheet may be used effectively.

Such flaps and pickets must be used as many as the number of specified positions in the middle of the sheet as shown in FIG. 5, and various methods have been known so far.

The most widely known method is the sewing method by a sewing machine. However, the sewn product is inferior in waterproof performance, and the sheet may be damaged by the sewing needles and the strength is lowered, and the sewing operation is low in productivity, and in manual sewing, in particular, it is extremely difficult to finish the sewing stitches in a straight line and the appearance is inferior, and if the sewing threads are loosened, the flaps may be detached, or the durability of sewing threads is inferior to that of the sheet, and hence the life is short on the whole.

To solve the problems of sewing, fusion methods have been attempted. For example, in a method shown in FIG. 6, the flap is fused to the middle of the sheet. In this method, a sheet is cut to a specified size and put on a floor having a fusion table serving also as cooling table of a specified length, a flap is overlaid at a specified position, and this flap is fused by using a handy type hot air blower or hot plate type fusion machine. In this job, the floor area for spreading the sheet of a specified size is required, and it is not easy to adjust the position by spreading the sheet and straightening creases by manual work, and it takes much time and labor to overlay the flap correctly to the specified fusion position. Further, when thus overlaid sheet and flap are fused, the tension at the time of fusion may not be matched between the sheet and flap, or the coefficient of thermal shrinkage may differ between the sheet and flap, and thereby deviation of sheet and flap may occur in the terminating portion after fusion, and in order to solve such problems, an industrial production method capable of fusing sheet and flap continuously is requested.

As a method of fusing the flap on the surface of the sheet, the hot air fusion method of fusing only the surface of the sheet and not deteriorating the inside of the sheet is desired, and as a method of fusing two sheets by hot air fusion method, a method of using a hot air fusion machine as shown in FIG. 7 is known. The hot air fusion machine comprises a pair of upper and lower rolls, a hot air feed nozzle, and a sheet guide for guiding sheets, and when fusing the ends of sheets together, the sheet guide for overlaying and guiding the sheets from both sides serves as a post, and the upper roll and the hot air feed nozzle may be set up thereon.

However, if attempted to fuse by hot air in the middle of the width direction of the broad sheet, since the upper roll and hot air feed nozzle cannot be installed, no industrial production method excellent in productivity has been known so far in the aspect of manufacture of long products by hot air fusion of flaps in the middle of the broad sheet.

Incidentally, as the tent for garage or for simplified warehouse, the tent for preventing entry of wind and rain especially from the sides for covering the root and sides of the skeletal members for forming the gable roof with tent sheets has been widely used. When erecting such tent, in order that the both sides may not be peeled off the skeletal members by wind pressure or the like, for example as shown in FIG. 8, horizontal mounting flaps are provided inside of the both sides of the tent sheets, and coupling eyelet or the like are formed in the flaps, or coupling eyelets are formed in the lowest ends of the both sides, and as shown in FIG. 9(a), ropes of specified lengths are passed in the eyelets, and wound to pipes or other parts of skeletal members, or as shown in FIG. 9(b), ropes are tied to the pipes at every position of the eyelets. In these methods, however, it takes much time and labor in passing ropes through eyelets and winding to pipes, or tying ropes to the eyelets, and it also requires skill, and unless the ropes are uniformly wound to pipes, the tent has wrinkles and other problems.

In a vast livestock farm, hay is harvested as the animal feed, and stacked up in blocks and stored outdoors for months. Such stacked hay must be protected with cover to shut off water and prevent from scattering. One block of stacked hay is, for example, as huge as 15 m wide by 30 m long by 5 m high.

Or raw cotton cropped from a cotton field is compressed to cotton modules of specified size, and piled up in the field for two weeks to six months before being shipped to the cotton mill. Cotton modules contain cotton seeds, which may be germinated by moisture such as rain to lower the quality of raw cotton, and therefore protection from water and prevention of scattering are required. Cotton modules are usually cubes of about several to ten tons to be directly transported by truck container, for example, in a shape of 2.5 m wide by 10 m long by 2.3 m high.

To cover such blocks of hay or cotton modules, cloth sheets of waterproof synthetic resin are linked as long as required, and the surface is tied with ropes so that the covering sheets may not be blown by strong wind, but it not only dangerous but also poor in efficiency to apply ropes over huge blocks covered with sheets, and position and tighten the ropes, and unless the sheets and ropes are coupled firmly, they are loosened with the passing of the time, and the tightened state may get loose.

Moreover, after use, if the ropes are separated from the sheets and get mixed in the hay, animals fed on the hay may be killed, or if mixed into raw cotton, it causes contamination and the cotton quality may be extremely lowered.

OBJECTS OF THE INVENTION

The invention is intended to solve the above problems. In particular, it is an object of the invention to present a flap fusion sheet preferably used in garage, simplified warehouse, scaffold sheet, hay cover, cotton cover and the like by forming sheets to be coupled to skeletal members by fusing flaps having eyelets or coupling holes drilled in the middle of a broad backing sheet, forming a sleeve by folding the flap in two and fusing, forming a sheet for tent to be coupled to the skeletal members by inserting through pipes or the like, or forming a sleeve by fusing both side ends of the flap and incorporating a flexible tightening member to form a sheet for cover to be tightened, and a method of manufacturing the same.

SUMMARY OF THE INVENTION

A first aspect of the invention relates to a flap fusion sheet formed by fusing a flap continuous in the longitudinal direction at least at positions other than end portions in the width direction at one side of a continuous backing sheet formed by laminating layers made of low melting point polyolefine on both sides of a flat yarn cloth made of high melting point polyolefine.

A second aspect of the invention relates to a manufacturing method of flap fusion sheet characterized by driving a flap continuous in the longitudinal direction on the upper surface of a running backing sheet by overlapping at least at one position in the width direction of the sheet, and fusing by hot air by pressing between a long roll disposed in the lower part of the running sheet and a short roll set up from the frame.

A third aspect of the invention relates to the flap fusion sheet used in garage or simplified warehouse.

A fourth aspect of the invention relates to the flap fusion sheet used in scaffold sheet.

A fifth aspect of the invention relates to the flap fusion sheet used in hay cover.

A sixth aspect of the invention relates to a flap fusion sheet formed by folding a flap continuous in the longitudinal direction in two, overlaying the side ends and fusing the inner sides of the side ends by heat to form a sleeve, at one side of a continuous backing sheet formed by laminating layers made of low melting point polyolefine on both sides of a flat yarn cloth made of high melting point polyolefine, and fusing the outer side of the sleeve in the longitudinal direction at least at other positions than the end portions in the width direction of the backing sheet.

A seventh aspect of the invention relates to the flap fusion sheet used in garage or simplified warehouse by inserting a pipe into the sleeve and coupling to an assembled member.

An eighth aspect of the invention relates to a flap fusion sheet formed by forming a flap by fusing both side ends of a flap continuous in the longitudinal direction by heat to a backing sheet, at one side of the continuous backing sheet formed by laminating layers made of low melting point polyolefine on both sides of a flat yarn cloth made of high melting point polyolefine.

A ninth aspect of the invention relates to the flap fusion sheet used in a hay cover by incorporating a flexible tightening member in the sleeve.

A tenth aspect of the invention relates to the flap fusion sheet used in a cotton cover by incorporating a flexible tightening member in the sleeve.

BRIEF DESCRIPTION OF THE DRAWINGS

FIG. 6 is an explanatory diagram of batch fusion method by a hot plate handy type fusion machine.

FIG. 7(a) is a front view of a conventional sheet end hot air fusion machine, and FIG. 7(b) is its side view.

FIG. 8 is an explanatory diagram showing a state of coupling to a tent sheet by using a conventional flap.

FIG. 9(a) is an explanatory diagram of a method of winding a rope to a pipe, and FIG. 9(b) shows a method of tying a rope to the pipe at each eyelet, both relating to the coupling method in FIG. 8.

PREFERRED EMBODIMENTS OF THE INVENTION

Figure 1:
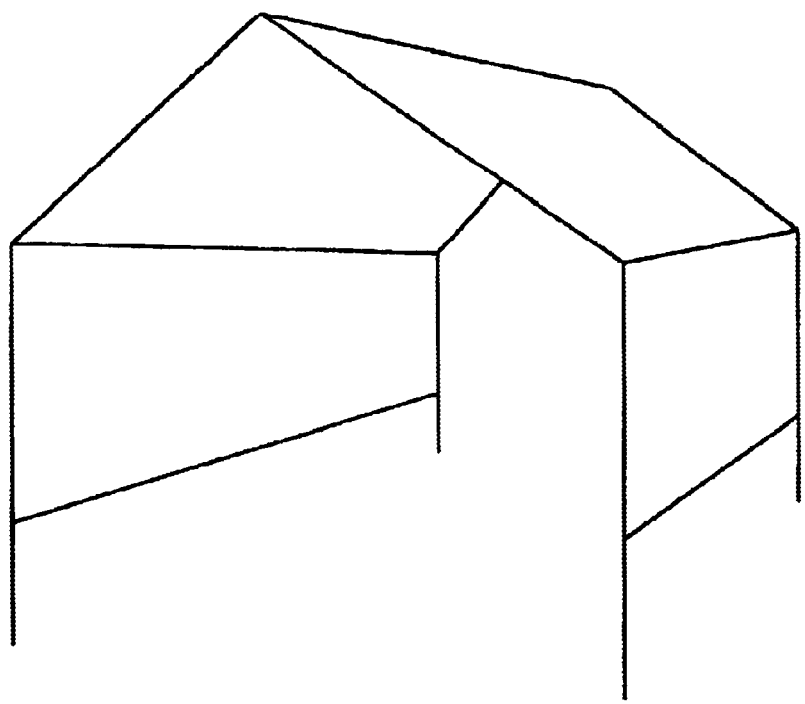
FIG. 1 is a schematic diagram of skeletal member and sheet for garage.

Referring now to the drawings, preferred embodiments of the invention are described in detail below.

The backing sheet used in the invention is composed of at least two kinds of polyolefine having a difference in melting point, and is more specifically a cloth sheet having a layer of low melting point polyolefine formed at least on one side of a woven cloth using flat yarns of high melting point polyolefine as the warp and weft, or a cloth sheet having a layer of low melting point polyolefine formed at least on one side of a woven cloth of high melting point polyolefine and low melting point polyolefine, with low melting point polyolefine forming at least part of the surface, and using parallel composite type flat yarns as the warp and weft, and the low melting point polyolefine layer should be present at least in part of the surface so that the flap may be fused by the low melting component.

The high melting point polyolefine is preferred to have a filament forming property and to obtain a high strength by the drawing effect, and further preferred not to deteriorate thermally when forming a covering layer. Specific examples are high density polyethylene, medium density polyethylene, straight-chain low density polyethylene, polypropylene, and propylene-ethylene copolymer of high melting point. These polyolefines may be used either alone or in combination of two or more types.

Examples of low melting point polyolefine are ultra-low density polyethylene, low density polyethylene, straight-chain low density polyethylene, ethylene-alpha-olefin copolymer of ethylene manufactured by using metallocene catalyst and alpha-olefin with three or more carbon atoms, ethylene-vinyl acetate copolymer, ethylene-alkyl ester acrylate copolymer, other polyethylene resins, propylene-ethylene random copolymer, syndiotactic polypropylene, and other polypropylene resins. These polyolefines may be used either alone or in combination of two or more types.

In the invention, the difference in melting point between the high melting point polyolefine and low melting point polyolefine used in combination is preferred to be 10° C. or more, and more preferably 20° C. or more. As far as the difference in melting point is more than 10° C., it is possible to fuse while lowering the thermal deterioration of filament yarn made of high melting point polyolefine due to heating for covering the low melting point polyolefine.

The backing sheet is composed by forming a layer of the low melting point polyolefine at least on one side of the woven cloth using flat yarns composed of the high melting point polyolefine as the warp and weft.

The flat yarn is formed by a known manufacturing method, and the film formed by T-die method or inflation method is sliced, drawn uniaxially in the longitudinal direction, and heated.

The composite flat yarn is made of high melting point polyolefine and low melting point polyolefine, and the low melting point polyolefine forms at least part of the surface, and more specifically a parallel type flat yarn having a low melting point polyolefine layer of lower melting point that the middle layer is used on both sides of the middle layer made of high melting point polyolefine.

A manufacturing method of composite filament yarn includes a known composite flat yarn manufacturing method of forming a multilayer film by inflation or T-die method and forming by slitting and drawing process.

The fineness of the flat yarn is 500 to 5000 d (denier), and more preferably 1000 to 3000 d. If the fineness is less than 500 d, the strength is insufficient as the backing sheet, and if exceeding 5000 d, the weaving efficiency is poor, the flexibility as woven cloth is inferior, the adhesion with the laminate layer is not enough, and the peeling strength is lowered.

The weaving density of flat yarn is 5 to 30/inch, more preferably 10 to 20/inch. The weaving texture includes various types such as plain weave, twill fabric, leno cloth, and figured gauze, and dense fabric or coarse mesh sheet. The weaving weight is 50 to 400 g/m$^2$, or preferably 100 to 300 g/m$^2$.

The method of forming a layer of low melting point polyolefine includes known methods such as extrusion lamination, dry lamination, heat compression lamination, and coating method, and in particular the extrusion lamination is preferred because of excellent adhesion strength. The thickness of laminate layer is not specified, but preferably 30 to 150 µm in order to keep coupling strength of backing sheet and flap by fusion, and more preferably 50 to 100 µm. The low melting point polyolefine is preferred to be of the same type and same series with the high melting point polyolefine from the viewpoint of enhancement of adhesion.

Figure 10:
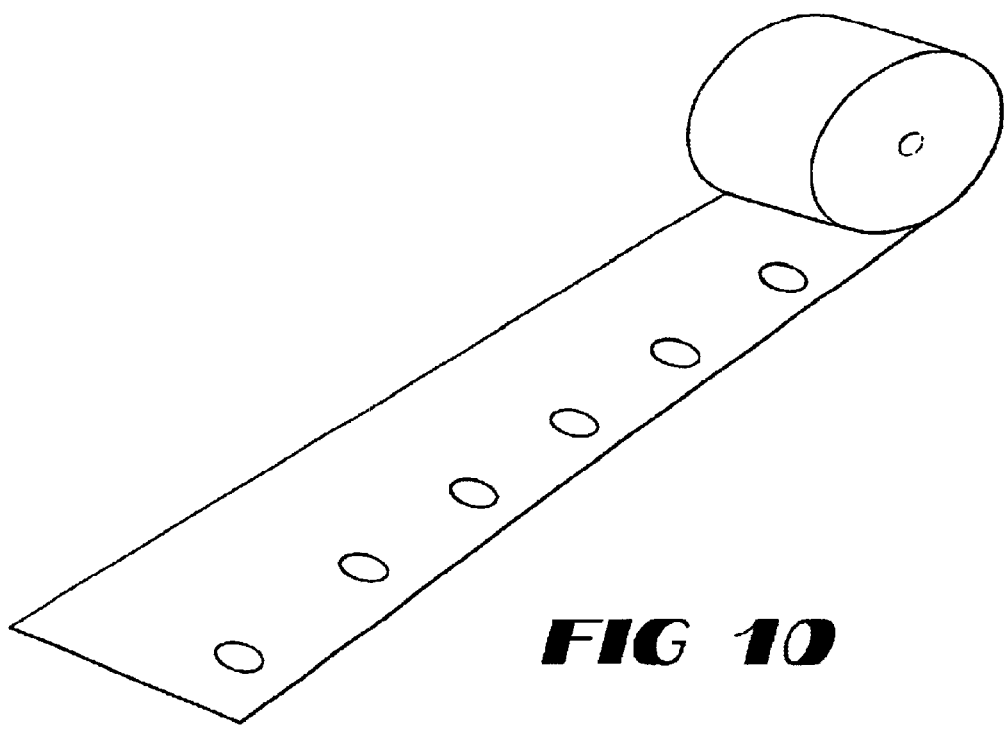
FIG. 10 is an explanatory diagram of a state of forming coupling holes at ends of a continuous flap.

The flap used in the invention is a heat-fusible backing sheet cut into a band of a specified size, and is a continuous long band for fusing continuously in the longitudinal direction of the backing sheet by the continuous fusion method mentioned below. Coupling holes are formed in this band, or eyelets are drilled at specified intervals, and the cut section may be properly treated, if necessary, to prevent from raveling (see FIG. 10).

The material of the flap is not particularly limited as far as it is fused by the low melting point polyolefine existing on the surface of the backing sheet, and from the viewpoint of enhancement of adhesion, it is preferred to be of the same type and same series as the backing sheet, and more preferably the flaps should be formed by cutting the same backing sheet.

Figure 11A:
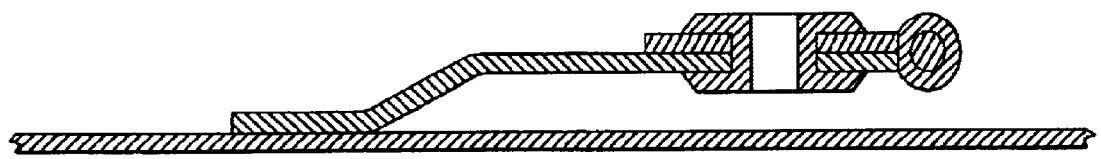
FIG. 11(a) is a sectional view of a flap in which a flap having eyelets is bonded.
Figure 11B:
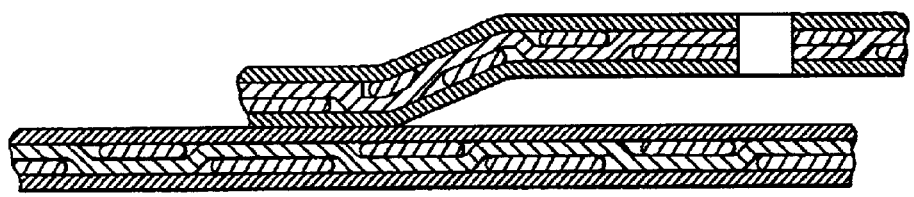
FIG. 11(b) is a sectional view explaining the state of heat fusion of laminated layer only without thermal deterioration of cloth.

The manufacturing method of flap fusion sheet by fusing the backing sheet and flap is shown, for example, in FIG. 11(a), in which the hot air fusion machine is used for fusing the flaps continuous in the longitudinal direction of drilling the eyelets on the sheet. At this time, when fusing the flap made of the same material as the cloth sheet having the laminate layer made of low melting point polyolefine at least on one side of the woven cloth made of high melting point polyolefine, the section of the fused sheet and flap should be as shown in FIG. 11(b), that is, it is important that only the laminate layer is fused while the woven fabric is not melted and is free from effects of thermal deterioration. The hot air fusion method is to blow hot air so that the fusion surface of the sheet and flap may be below the melting point of the cloth polyolefine and above the melting point of the laminate layer, and to fuse by pressing from above and beneath by a pair of rolls. In the case of fusing flaps to the woven cloth using composite filament yarns in the warp and weft, the low melting point polyolefine forming at least part of the surface of the composite filament yarns is fused, and the high melting point polyolefine is free from thermal deterioration, and a flap fusion sheet of high strength is obtained.

Figure 12:
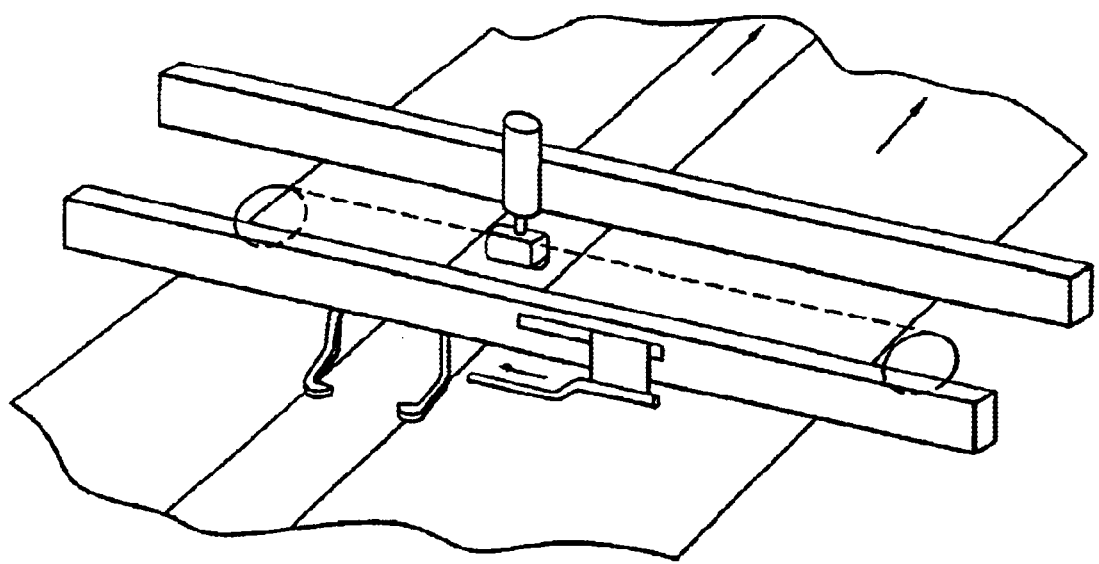
FIG. 12 is a prototype diagram for constituting a long roll for supporting the sheet of the invention, a short roll set up from the frame, a sheet guide and a hot air feed nozzle.

As a specific example of continuous manufacturing method of hot air fusion method, hot air fusion is performed by a hot air fusion apparatus comprising a long roll 2 supporting a sheet from beneath the running sheet, a short roll 5 perpendicularly set up from a frame 4 for pressing a flap 3 from above, a sheet guide 6 for guiding and positioning the flap to the specified position of the running sheet, and a hot air feed nozzle 7 for blowing hot air between the sheet and flap (see FIG. 12).

By the hot air fusion apparatus, the flap positioned and guided to the specified position of the running sheet is heated on the fusion side as the hot air feed nozzle movable laterally moves between the sheet and flap and feeds hot air, and the sheet and flap to be pressed are pressed by a pair of the long roll for supporting the sheet from beneath and the short roll set up perpendicularly from the frame, and are fused by hot air.

Figure 13:
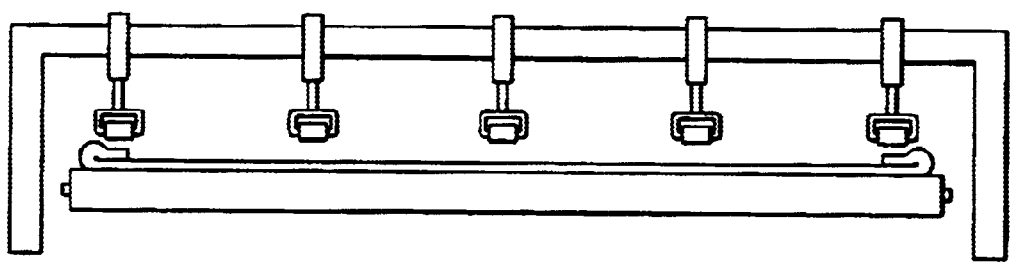
FIG. 13 is a schematic front view of a hot air fusion machine of the invention.
Figure 14:
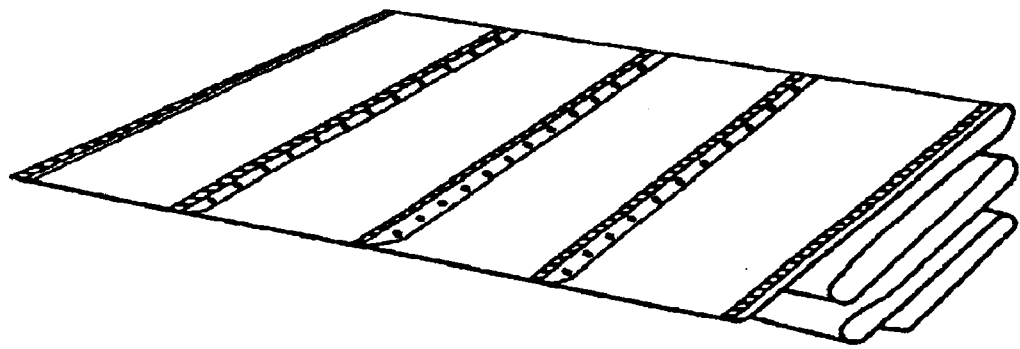
FIG. 14 is an explanatory diagram of a long product plaiting down a flap fusion sheet of the invention.
Figure 15:
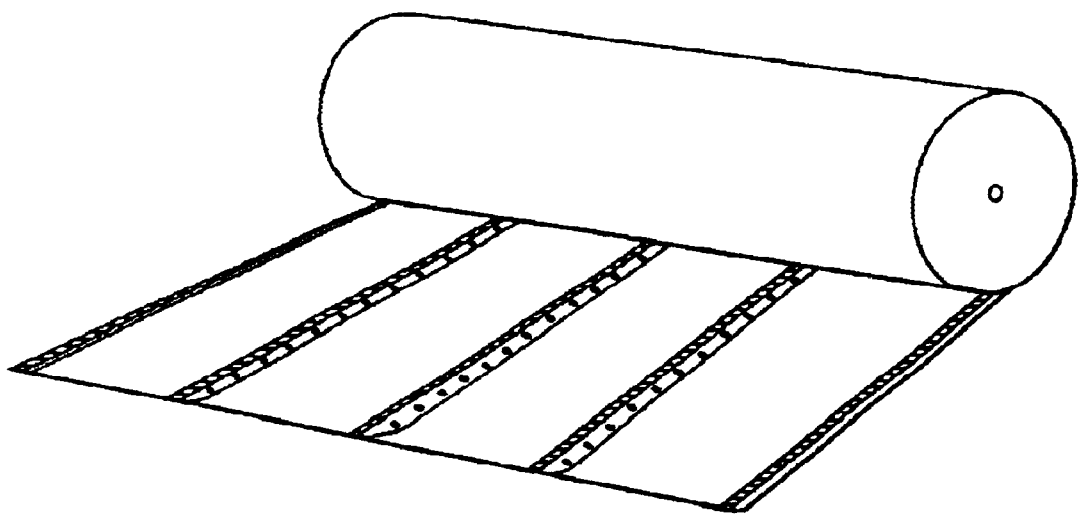
FIG. 15 is an explanatory diagram of a long product taking up a flap fusion sheet of the invention.

Such perpendicular short roll, sheet guide, and hot air feed nozzle can be installed at arbitrary positions of the frame by an arbitrary number, and therefore a long flap fusion sheet can be manufactured by fusing an arbitrary number of flaps at arbitrary positions in the width direction of the sheet continuously in the longitudinal direction. FIG. 13 is a schematic diagram showing installation of five lines of short rolls and long rolls by omitting the sheet guide and hot air feed nozzle, and by using such apparatus, as shown in FIG. 14 and FIG. 15, having three lines formed in the middle continuously in the longitudinal direction, a long flap fusion sheet hemmed by folding over the edges at both ends can be obtained in a plaited form or wound form.

The number of fusion positions in the width direction of the sheet is arbitrary, but it is usually about 1 to 10. The flap fusion sheet fuses flaps continuous in the longitudinal direction at least at one position in the width direction of the backing sheet, and at least one of the fused flaps should be position outside of the end portion of the backing sheet (for example, at a position remote from the end by 50 cm or more).

Thus obtained long flap fusion sheet is cut to a desired length depending on the application and finished, and manufactured into products such as garage, simplified warehouse, scaffold sheet and hay cover, and therefore the productivity is extremely excellent, and the loss is minimum, so that products of low cost are obtained.

For example, when used as the tent sheet for garage as shown in FIG. 1, the sheet is stretched not only to the roof of the skeletal members but also to the sides, and the shielding effect is given and the appearance is improved. In this case, the sheet is preferred to be coupled with the skeletal members not only at the ridge of the root top but also at contact point with the side skeletal member, and the flap having coupling holes is fitted to the positions corresponding to the ridge of the roof top at the back side of the sheet and the contact point with the side skeletal member, and the coupling holes and the skeletal members are coupled by tying the ropes or the like, so that the sheet is firmly coupled to the skeletal member.

Figure 2:
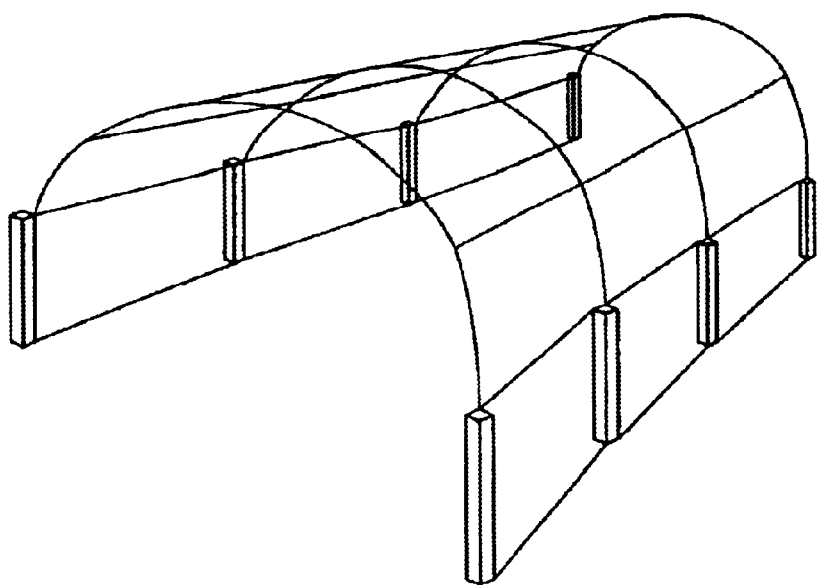
FIG. 2 is a schematic diagram of skeletal member for simplified warehouse.

FIG. 2 shows skeletal members used in the tent sheet for simplified warehouse, in which flaps are attached to the back side positions of the sheets contacting with the skeletal members in the longitudinal direction for forming the profile of the tent sheet for simplified warehouse, and this is preferably used the tent sheet for simplified warehouse or tent sheet for stable.

Figure 3A:
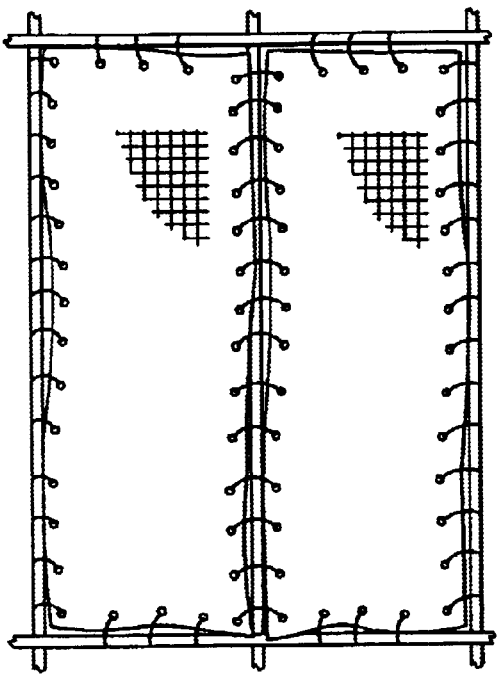
FIG. 3(a) is an explanatory diagram of scaffold sheet and coupling method in a prior art.
Figure 3B:
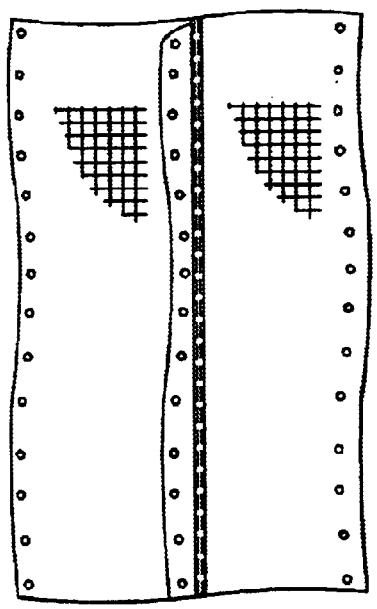
FIG. 3(b) is a schematic diagram of flap fusion sheet of the invention.

FIG. 3 is an example used as scaffold sheet, and usually the scaffold sheet is 1.8 m wide by 5.1 m long as shown in FIG. 3(a), and is used by coupling to the pipe rack or similar skeletal member by coupling ropes, but it takes time and labor for positioning and coupling each sheet, and gaps are formed between coupled sheets and the safety is lowered, but as shown in FIG. 3(b), for example, when a flap having coupling holes in the middle is attached to the sheet of 3.6 m wide by 5.1 m long in a size of joining two conventional sheets, the number of sheets to be coupled is decreased and the working efficiency is enhanced, and moreover gaps between sheets are decreased and the safety is enhanced, and this is particularly used preferably in the scaffold sheet.

Figure 4:
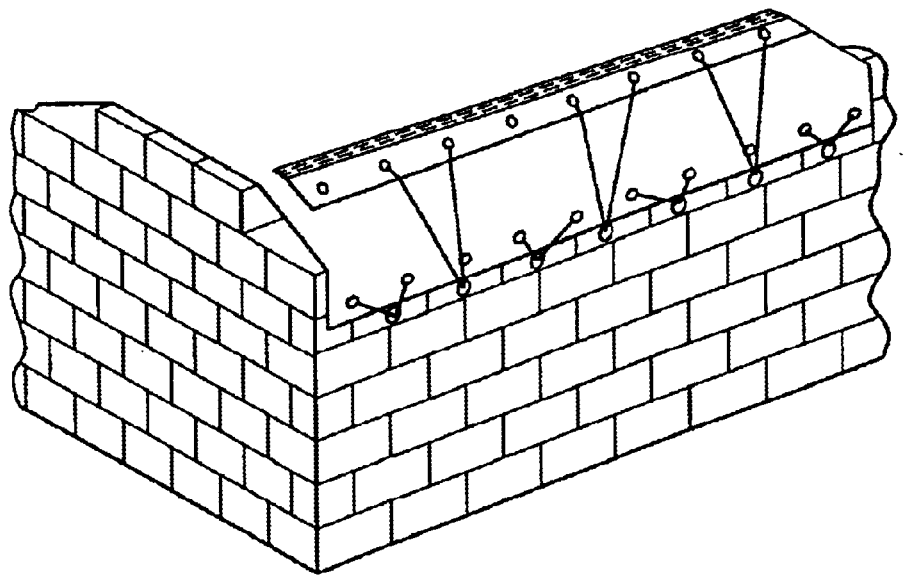
FIG. 4 is a diagram of state of use of a hay cover.
Figure 5:
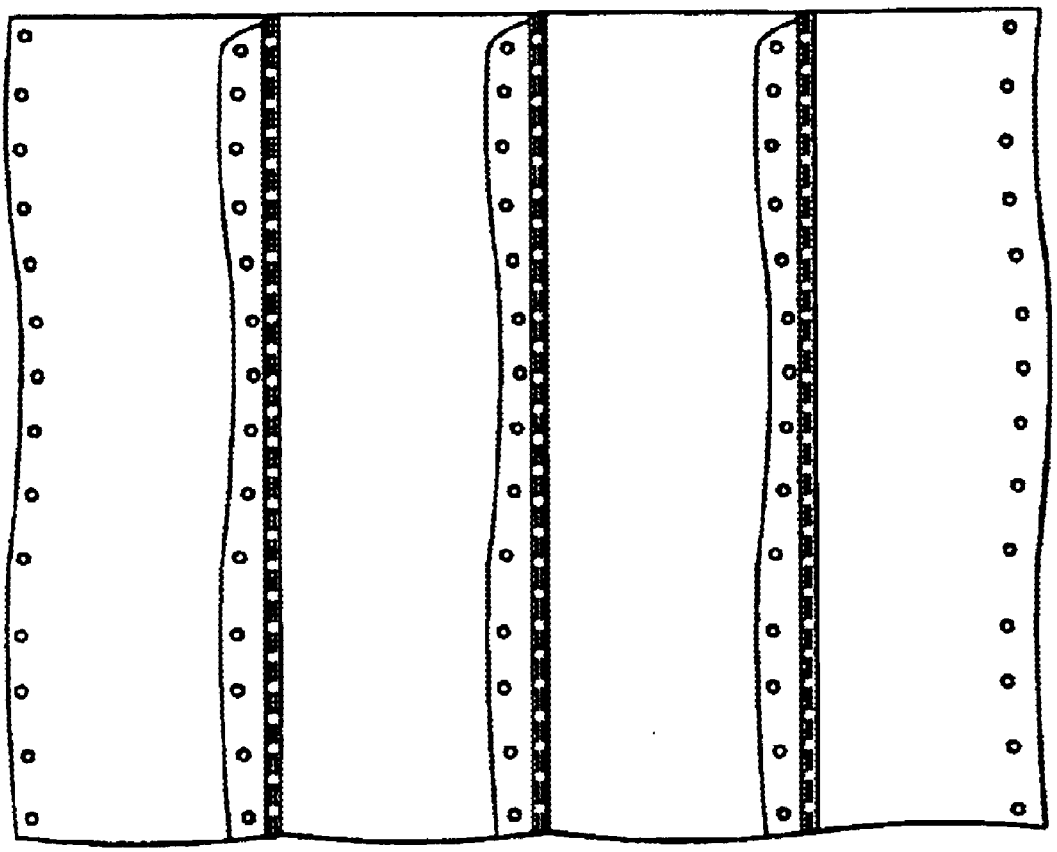
FIG. 5 is an explanatory diagram of a conventional sewn sheet with a flap formed in the middle for use in garage.

FIG. 4 shows a hay cover, which is used to protect a stacked block of hay from water and prevent from scattering, but when pulled excessively in the horizontal direction in order to prevent from scattering, the stress is concentrated in the hemmed portion and it is likely to tear apart, but when a high strength sheet is used to prevent from tearing, the cost is higher. Accordingly, when a picket for tensile fixing tool is attached to one side of the sheet, the tensile stress is dispersed between the hemmed portion and the picket and breakage of the sheet may be prevented, and a low-cost sheet may be used effectively.

Figure 16:
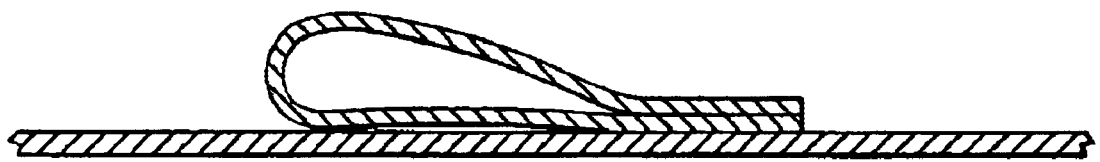
FIG. 16 is a schematic sectional view in a state of folding a flap in two to form a sleeve, and fusing to a sheet.

In the invention, as one of the methods of fusing the flap and forming a sleeve, the flap is folded in two, the side ends are joined, and the inner sides of the side ends are fused by heat to forma sleeve. Flaps are preferred to be continuous, and the formed sleeves are continuous. The formed sleeve is fused by heat, and adhered to the fusible cloth sheet. The material of the flap is not particularly limited as far as it is fusible by heat, and preferably it should be of the same material as the cloth sheet from the viewpoints of adhesion, molding and productivity (see FIG. 16).

Figure 17:
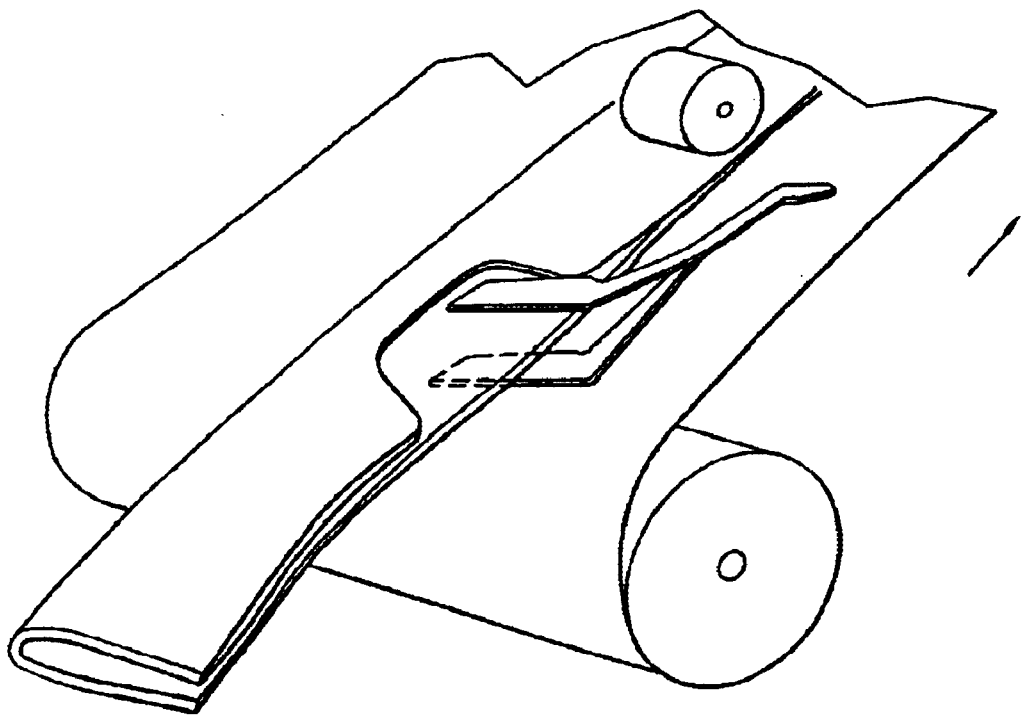
FIG. 17 is a partially cut-away explanatory diagram showing a method of fusing to a sheet in one process while forming the sleeve in FIG. 16.

In a method of producing from forming of sleeve till heat fusion to the cloth sheet in one process, as shown in a partially cut-away view in FIG. 17, the flap folded in two runs on the propelled cloth sheet, hot air feed nozzles are placed between the cloth sheet and flap, and between side ends of flap, the junction surface is heated by the blown hot air, and the roll at the running downstream side presses to fuse by heat. In this way, forming of sleeve and adhering of sleeve to cloth sheet are finished in one process, and a long tent sheet material is obtained continuously. From this material, by cutting into a required length for desired garage, it is applicable to versatile specifications.

Figure 18:
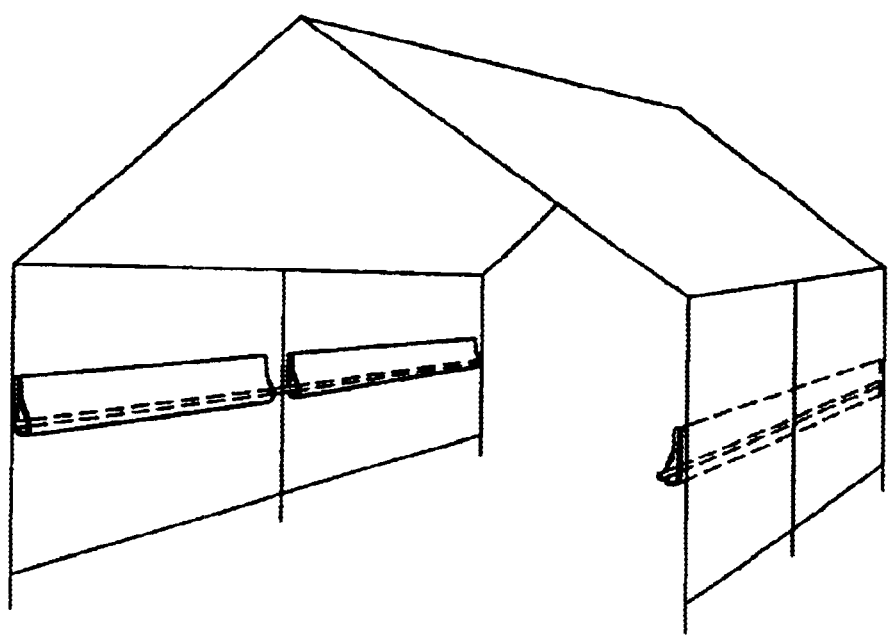
FIG. 18 is a schematic diagram of forming a tent by using a sheet forming the sleeve in FIG. 16.
Figure 19:
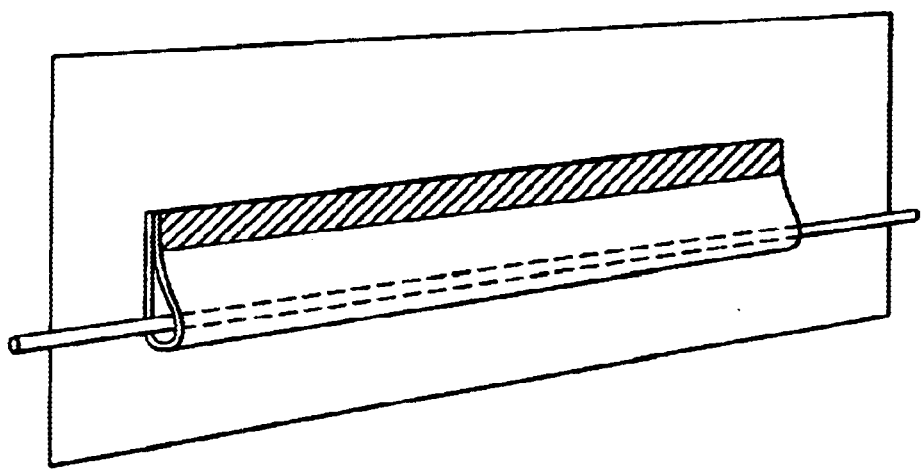
FIG. 19 is an explanatory diagram of a state of coupling by inserting a pipe into the sleeve in FIG. 16.

The sleeve is adhered, for example, to the middle position of the both side faces of the tent in the horizontal direction by thermal fusion as shown in FIG. 18. The adhered sleeve is preferred to be adhered continuously to the both ends of the side. However, the sleeve adhering position is not limited to this, but it may be attached to the lowest end of the side depending on the constitution of the skeletal member, or at plural positions of the side. As required, moreover, it may be also attached to the roof, and anyway by coupling the pipe to the skeletal member through the pipe, the tent sheet is stretched easily, quickly and with a uniform tension to the skeletal member (see FIG. 19).

This tent sheet material may be preferably used, depending on the constitution of the skeletal members for composing the tent, in such applications as the tent sheet for garage, tent sheet for simplified warehouse, or tent sheet for stable.

Figure 20:
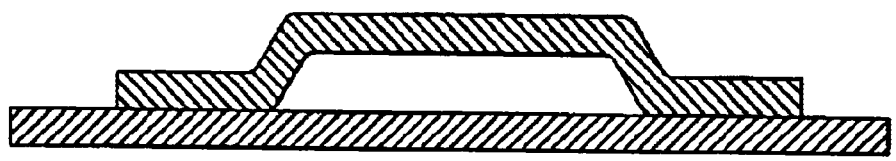
FIG. 20 is a schematic sectional view of a state of forming a sleeve by fusing both ends of a flap in the width direction to a sheet.

In this method, in other method of fusing the flap and forming a sleeve, both ends of the flap in the width direction are fused to the backing sheet, and a gap is provided between the flap and the backing sheet, and a sleeve is formed (see FIG. 20).

Figure 21:
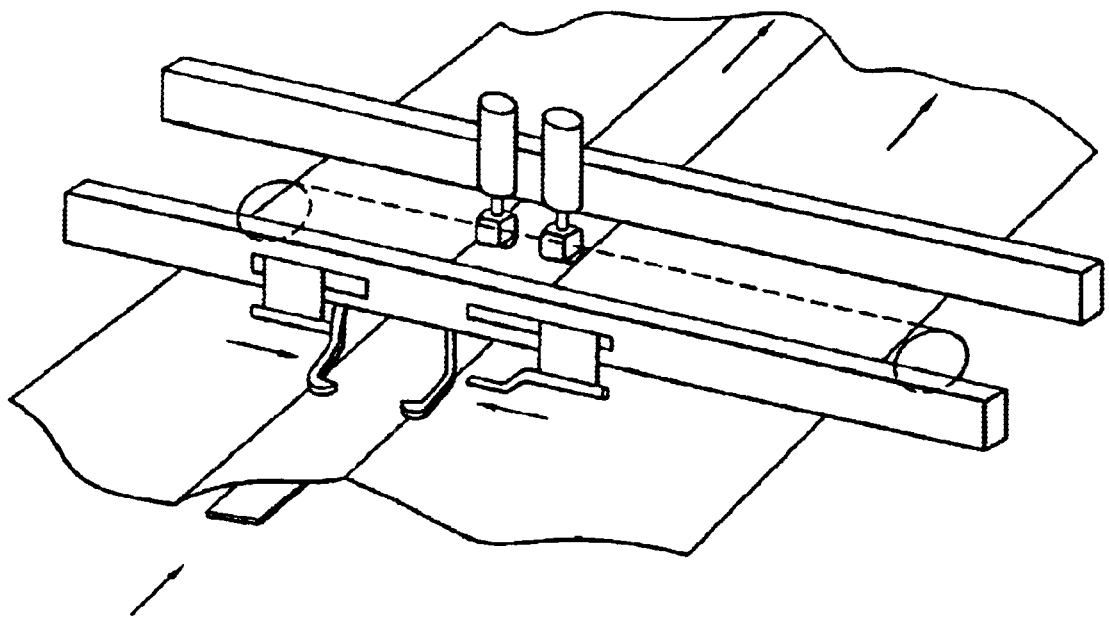
FIG. 21 is a prototype diagram for constituting a long roll for supporting the sheet, a short roll set up from the frame, a sheet guide and a hot air feed nozzle, for forming a sleeve by fusing both ends of a flap in the width direction to a sheet.

As a method of manufacturing the sleeve, for example as shown in FIG. 21, by using a hot air fusion apparatus comprising receiving roll for supporting the backing sheet from beneath the running backing sheet, a pressing roll perpendicularly set up from the frame for pressing the both ends in the width direction of the flap for forming a sleeve, a sheet guide for guiding and positioning the flap to the specified position of the running backing sheet, and a hot air feed nozzle for blowing hot air between the backing sheet and the flap, the both ends in the width direction of the flap are fused to the backing sheet, and the sleeve is provided on the backing sheet.

Such perpendicular pressing roll, sheet guide and hot air feed nozzle may be installed at arbitrary positions of the frame by an arbitrary number, and an arbitrary number of sleeves may be provided at arbitrary positions in the width direction of the backing sheet.

Figure 22:
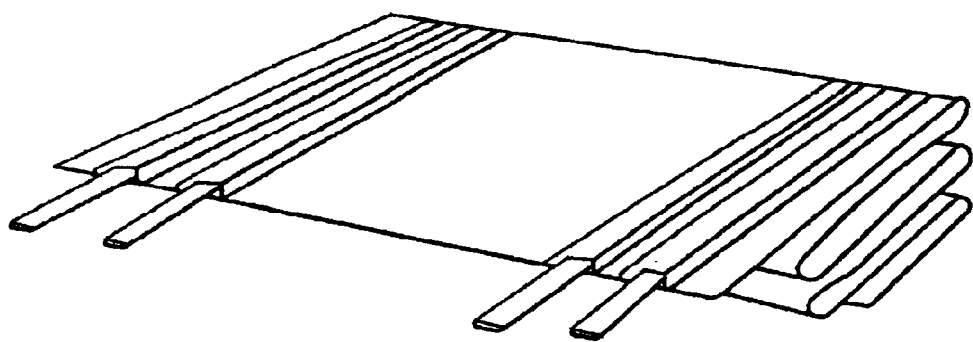
FIG. 22 is an explanatory diagram of a plaited state of a sheet incorporating a flexible tightening member in the sleeve in FIG. 20.

In the sleeve, a flexible tightening member is incorporated, and when the sheet fusing the sleeve is used as the cover, the cover can be tightened to the object so that the cover may not be blown away from the object (FIG. 22).

Figure 23:
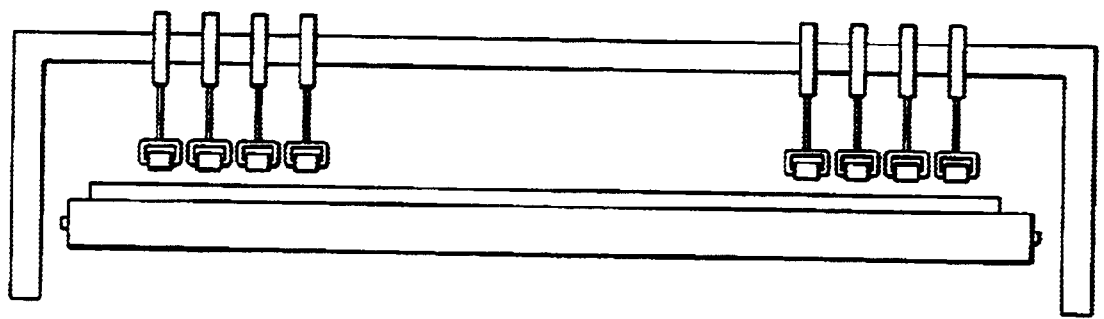
FIG. 23 is a schematic front view of a hot air fusion machine in FIG. 21.

FIG. 23 is a schematic diagram of hot air fusion apparatus comprising eight lines of pressing rolls and receiving rolls, omitting the sheet guide and hot air feed nozzle, and by using such apparatus, as shown in FIG. 22, the sleeve is provided in the longitudinal direction in the middle of the backing sheet, and the sheet incorporating the flexible tightening member for cotton cover capable of incorporating the flexible tightening member is formed.

Figure 24:
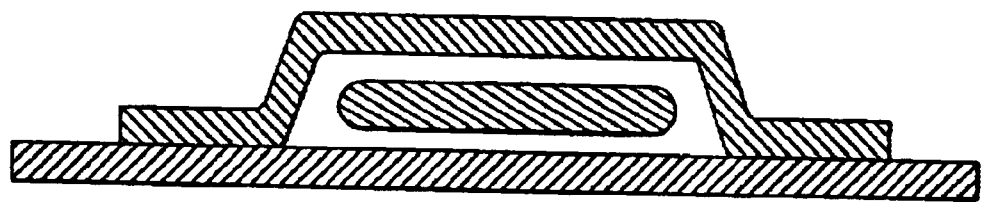
FIG. 24 is a schematic sectional view of a sheet incorporating a flexible tightening member in the sleeve in FIG. 20.

In FIG. 24, the flexible tightening member is incorporated in the formed sleeve, and the flexible tightening member is easily slidable.

As a method of incorporating the flexible tightening member in the sleeve, in the process of fusing the flap, as shown in FIG. 21, the flexible tightening member is supplied together with the flap, and the flexible tightening member is incorporated in the sleeve simultaneously when forming the sleeve, so that the sheet incorporating the flexible tightening member may be formed.

The flexible tightening member has a flat sectional shape as shown in FIG. 24, and it is preferred to be flexible and smaller in elongation than the backing sheet mentioned below. If the elongation of the flexible tightening member is larger than that of the backing sheet, after once tightening an expandable object such as hay and cotton module, when swollen, if the flexible tightening member is elongated and the backing sheet is not elongated, the backing sheet may be broken within the remaining range of the tensile strength of the flexible tightening member. By nature, it is preferred to be flat in sectional shape and foldable.

Figure 25:
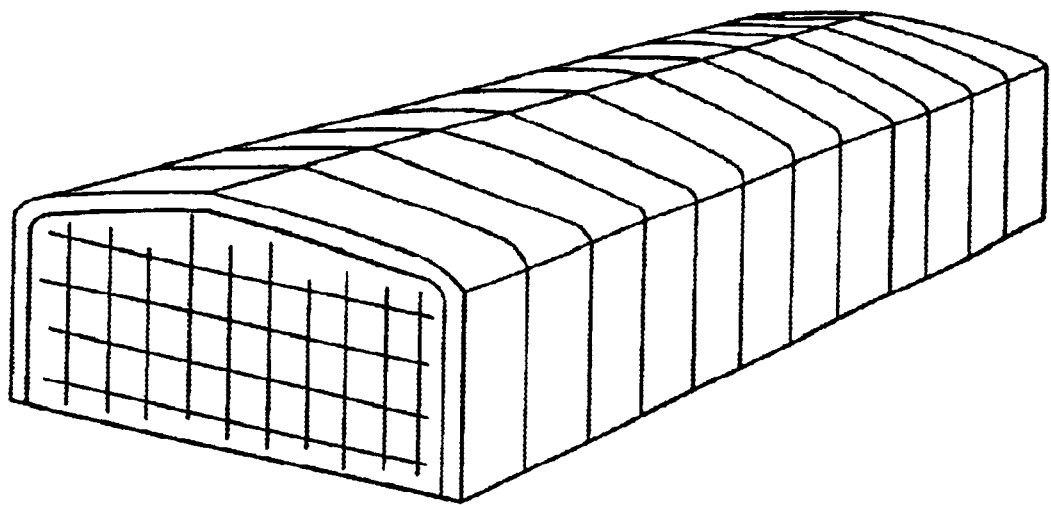
FIG. 25 is a diagram of state of using a sheet incorporating a flexible tightening member in the sleeve in FIG. 20 in a large-scale hay cover.

The hay cover shown in FIG. 25 is a cover for enveloping a huge block of hay measuring, for example, 15 m wide by 30 m long by 5 m high. Such hay cover is designed to couple the flexible tightening member incorporating sheet of, for example, 5 m wide by 25 m long in the width direction at the coupling unit to form a giant cover to cover the block of hay, and each cover is tightened by the flexible tightening member incorporated in one sleeve provided in the middle of the flexible tightening member incorporating sheet. Tightening such giant cover with rope is very difficult, and the working efficiency is notably enhanced by using the flexible tightening member incorporating sheet of the invention.

Figure 26:
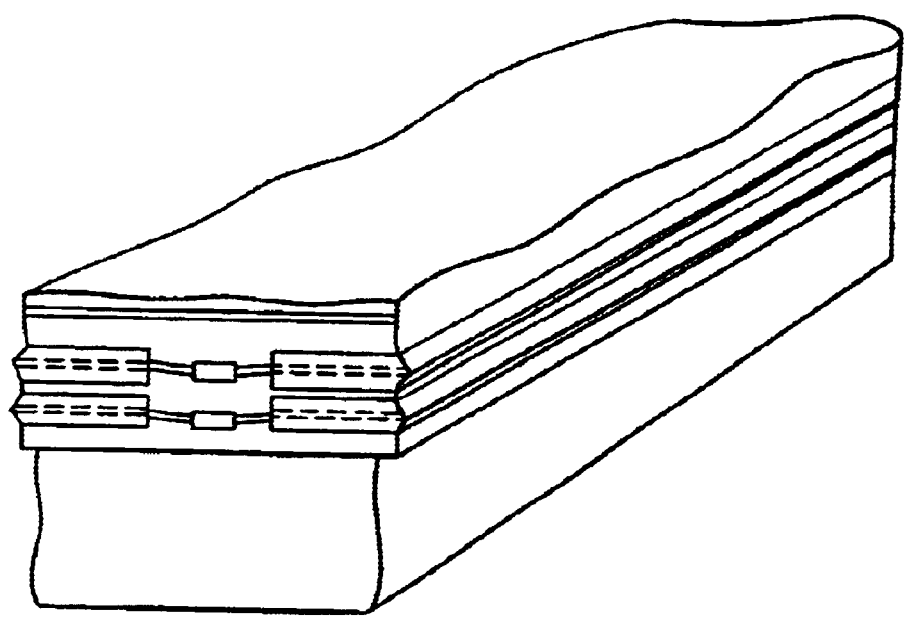
FIG. 26 is a diagram of state of using a sheet incorporating a flexible tightening member in the sleeve in FIG. 20 in a cotton cover.

The cotton cover shown in FIG. 26 is a cover for enveloping a nearly cubic cotton module, having a ceiling, both sides for covering the both side walls, and front and rear faces for covering the front and rear walls. The flexible tightening member incorporating sheets of the invention are used in the both sides for covering the both side walls, and front and rear faces for covering the front and rear walls, and the cover sheet body used as the cotton cover is surrounded by one sleeve along the lowest edge and one sleeve in the middle part, in a total of two sleeves, and one flexible tightening member is incorporated in each sleeve.

The cotton cover of the invention is preferred to be made of one continuous material at least in the coupling edge of the ceiling and the both sides. Not limited to this, however, it is all right as far as the boundary is waterproof by fusion processing or the like. It is preferred from the point of ease of manufacture to integrate the boundary of the ceiling and the front and rear faces by forming a fusion portion by fusion processing.

Figure 27:
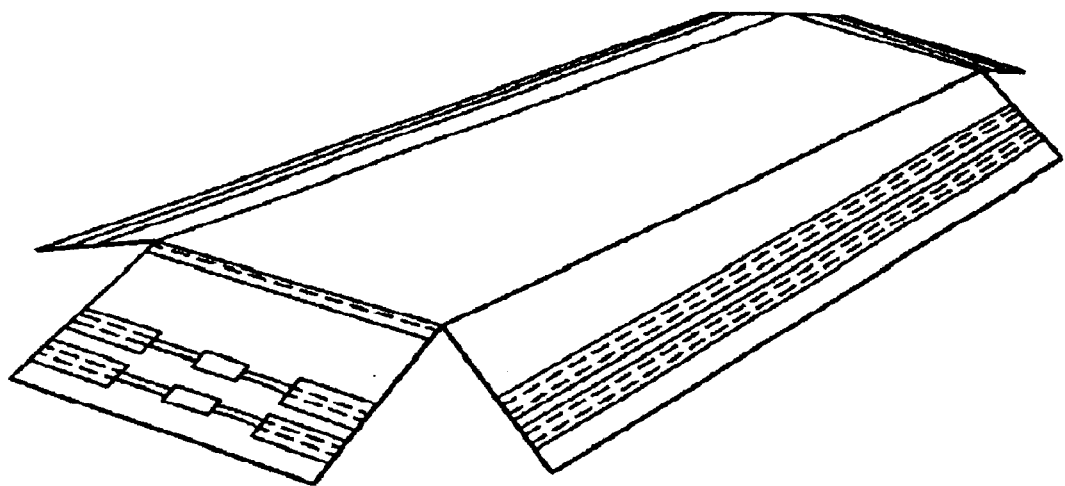
FIG. 27 is an explanatory diagram showing an intermediate manufacturing state of the cotton cover in FIG. 26.

FIG. 27 shows an example of an intermediate manufacturing state of the cotton cover shown in FIG. 26. One sheet for composing the ceiling and the both sides, and two sheets of the same material for composing the front and rear faces are prepared. The side ends of the both sides and the side ends of the front and rear faces are integrated to form a cotton cover, and from the viewpoint of waterproof property and ease of processing, it is preferred to integrate by forming a fusion portion by fusion processing.

In the total of three sheets, it is preferred to form preliminarily at least one bag for incorporating the rope 7 for tightening the surrounding of the cotton cover in the horizontal direction. In FIG. 26, the bag is provided near the end in the horizontal direction. This bag is provided preferably by fusing the same long material as the main body sheet. At this time, it is preferred to incorporate the rope preliminarily in the bag to be formed. This bag has the function of supporting the rope for tightening the surrounding, and is not required to be a continuous long piece, and plural bags may be partly provided in the horizontal direction. In FIG. 26, bags are provided at two parallel positions, but the number of bags is not particularly limited. Beneath the bag at the lowest end provided in the horizontal direction, it is preferred to form a skirt by drooping the end of the sheet by about 100 to 300 mm. By thus forming the skirt, when the cover is tightened from the surrounding by tightening the rope 7 incorporated in the bag, the end of the skirt is directed outward, and the rainwater dropping along the skirt falls outward from the side and front and rear of the cotton module, so that the waterproof performance may be enhanced.

The cover sheet is preferred to be made of a single material continuous with the ceiling and the both sides, but a linked material may be also used as far as the boundary is waterproof by fusion processing or the like. The coupling edge of the ceiling and the front and rear faces is preferred to be integrated by fusing the boundary surface from the viewpoint of ease of manufacture.

At this time, in order to communicate from the both sides to the front and rear faces with the flexible tightening member, the both ends of the flexible tightening member are also properly cut or joined. For joining, depending on the material of the flexible tightening member, it may be realized by sewing, fusing or using coupling bracket.

At the front face or front and rear faces of the cotton cover, using a tightening tool composed of a pair of hooks and a buckle, or a specific belt tightening tool, the rope wound around the cotton cover is tightened. A woven belt is preferred as the rope used in the belt tightening tool.

Figure 28:
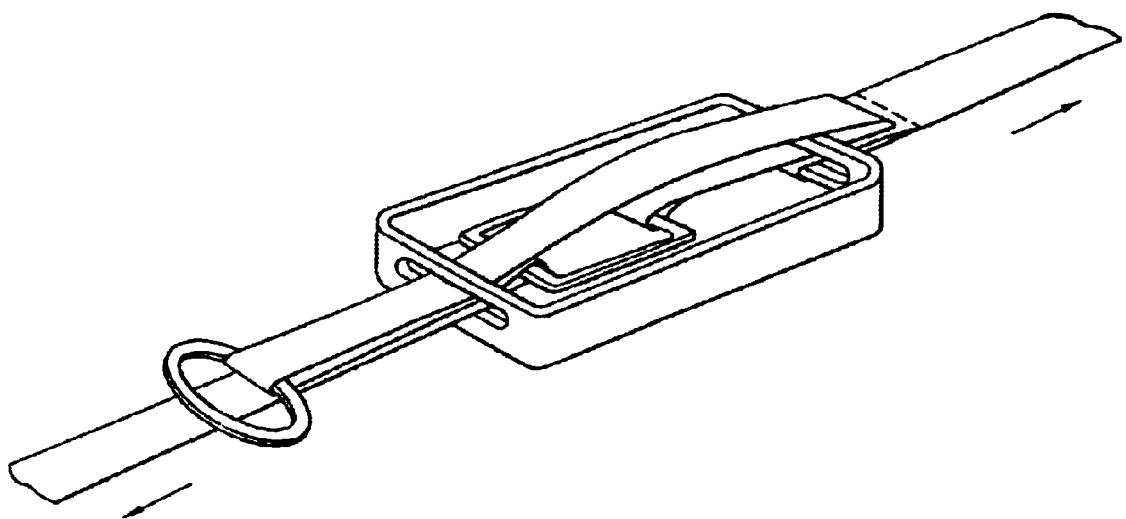
FIG. 28 is a schematic explanatory diagram of a belt tightening tool.

The specific belt tightening tool is preferably a belt tightening tool comprising, as shown in FIG. 28, a base frame, in which a first opening is provided at one side of the hollow frame, one edge of the first opening is a first coupling portion for coupling one end of the woven belt, other edge of the first opening is a first winding portion for winding the woven belt, and a second opening is provided at other end opposite to the first opening, an annular frame place in the base frame so as not to insert the second opening, and a stopping frame having a second coupling portion for connecting one side of the annular frame to the other end of the woven belt, and a second winding portion for winding the other end near the first opening opposite to the second coupling portion around the woven belt, and in this constitution one end of the woven belt wound around the cotton cover is coupled to the first coupling portion, the other end of the woven belt is inserted into the second opening, the second winding portion is wound, then the second opening is inserted again, the second opening is inserted once more through the stopper, and after winding the first winding portion, it is coupled to the second coupling portion of the stopping frame.

As the tightening method of the belt tightening tool, one end of the woven belt on which the cotton cover is preliminarily wound and the other end of the woven belt are coupled to the belt coupling tool as mentioned above, and it is preferred to keep a sufficient extra portion in the woven belt at the other end of the woven belt. When starting to tighten, first, the woven belt is drawn in the direction A together with the stopper, and when the woven belt is fully drawn and tightened to the tightening position, the leading end of the stopping frame abuts against the second opening of the frame body by ten tensile force in the direction A of the woven belt, and by the frictional force between the leading end of the stopping frame and the woven belt held on the periphery of the second opening of the base frame, and base frame and stopping frame are stopped and tightening is complete.

When releasing the tightened woven belt, the stopped base frame and stopping frame are separated, and for this method by moving the area around the second coupling portion of the stopping frame in the vertical direction in the drawing by hand, the contact point with the second opening is released, or by pulling the woven belt in the direction A, the woven belt is pulled in the direction B, so that the stopping frame is moved in the direction B, thereby separating the contact point of the leading end of the stopping frame and the periphery of the second opening of the base frame. As a result, the extra portion of the woven belt held and tightened between the leading end of the stopping frame and the periphery of the second opening of the base frame is loosened and released, so that tightening is cleared. Thus, it is a main feature of the invention that the tightening can be easily released with a small effort only by separating the contact point of the base frame and the stopping frame.

Figure 29:
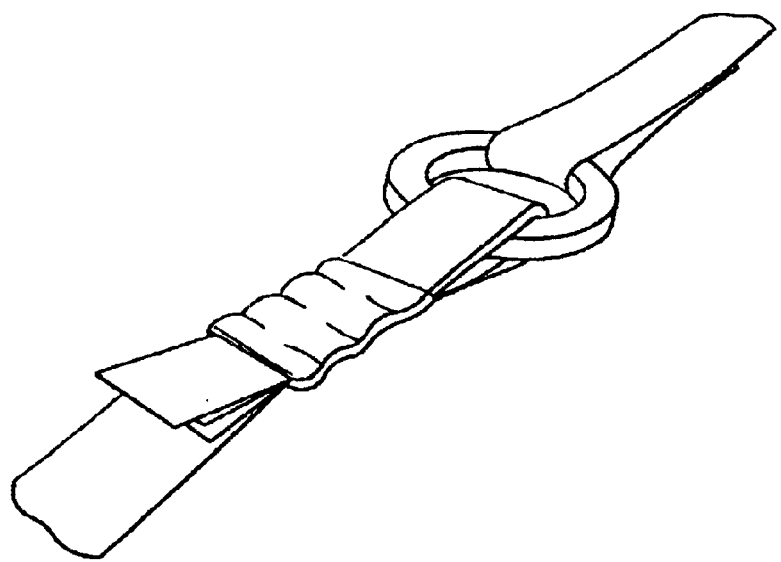
FIG. 29 is an explanatory diagram of a method of coupling a synthetic resin band to a coupling bracket.

As the rope, the woven belt, synthetic resin band and other may be properly used. The synthetic resin band is preferably used as the rope because it is excellent in handling and durability, inexpensive, and small in elongation, and specifically drawn polyester band or polypropylene band is preferred. However, for the belt tightening tool, it is not preferred to use the synthetic resin band, and therefore the synthetic resin band is used by coupling with the woven belt. For coupling them, generally, an annular coupling bracket is used, and in this case, as shown in FIG. 29, it is preferred to wind a hoop iron around the coupling portion of the coupling bracket, wind the synthetic resin band along the wound hoop iron, integrate them together by using a crimping tool, and coupled to the coupling bracket. If the synthetic resin band is directly coupled to the coupling bracket without inserting the hoop iron, the synthetic resin band may be easily broken by the shearing force applied from an oblique direction.

The synthetic resin used in the invention may be blended with common additives in a range not departing from the true spirit of the invention, such as antioxidant, ultraviolet absorbent, photo stabilizer, dispersant, lubricant, antistatic agent, pigment, inorganic filler, crosslinking agent, foaming agent, nucleating agent, etc.

As described herein, the flap fusion sheet of the invention is a long sheet fusing a specific number of flaps at specified positions of a broad backing sheet, and such long product can be obtained at high productivity and low cost. From the obtained long product, it can be cut into flap fusion sheets of specified dimensions depending on the application and purpose. This flap fusion sheet is used preferably in garage, simplified warehouse, scaffold sheet, hay cover, etc. The flap may be folded in two to forma sleeve, and fused to the specified position of the backing sheet to obtain a long sheet, which may be used by coupling to a skeletal member by inserting a pipe into the sleeve formed when used in garage, simplified warehouse or the like, so that it is easily and quickly stretched with a uniform tension, and the tent sheet maybe attached to the skeletal member. Moreover, the long sheet prepared by fusing both ends of the flap in the width direction to the backing sheet to form a sleeve, and incorporating synthetic resin belt or flexible tightening member into the sleeve may be used in a large-scale cover such as hay cover and cotton cover, and in such a case, the cover can be tightened to the object securely and safely, and this cover can prevent contamination of the synthetic resin belt, etc.

These flap fusion sheets and their manufacturing method are excellent in productivity, and bright about excellent effects as industrial products and their production technology at low cost.

What is claimed is:

1. A flap fusion sheet formed by folding a flap continuous in the longitudinal direction in two, overlaying the side ends and fusing the inner sides of the side ends by heat to form a sleeve, at one side of a continuous backing sheet formed by laminating layers made of low melting point polyolefine on both sides of a flat yarn cloth made of high melting point polyolefine, and fusing the outer side of the sleeve in the longitudinal direction at least at other positions than the end portions in the width direction of the backing sheet.

2. A flap fusion sheet of claim 1 used in roofing of garage or simplified warehouse by inserting a pipe into the sleeve and coupling to an assembled member.

3. A flap fusion sheet formed by forming a flap by fusing both side ends of a flap continuous in the longitudinal direction by heat to a backing sheet, at one side of the continuous backing sheet formed by laminating layers made of low melting point polyolefine on both sides of a flat yarn cloth made of high melting point polyolefine.

4. A flap fusion sheet of claim 3 used in a hay cover by incorporating a flexible tightening member in the sleeve.

5. A flap fusion sheet of claim 3 used in a cotton cover by incorporating a flexible tightening member in the sleeve.

6. A manufacturing method of flap fusion sheet characterized by driving a flap continuous in the longitudinal direction on the upper surface of a running backing sheet by overlapping at least at one position in the width direction of the sheet, and fusing by hot air by pressing between a long roll disposed in the lower part of the running sheet and a short roll set up from the frame.

* * * * *